May 10, 1966
S. DANILUK ETAL
3,250,408
TRUCK LOADING AND UNLOADING DEVICE
Filed Sept. 3, 1963
4 Sheets-Sheet 3
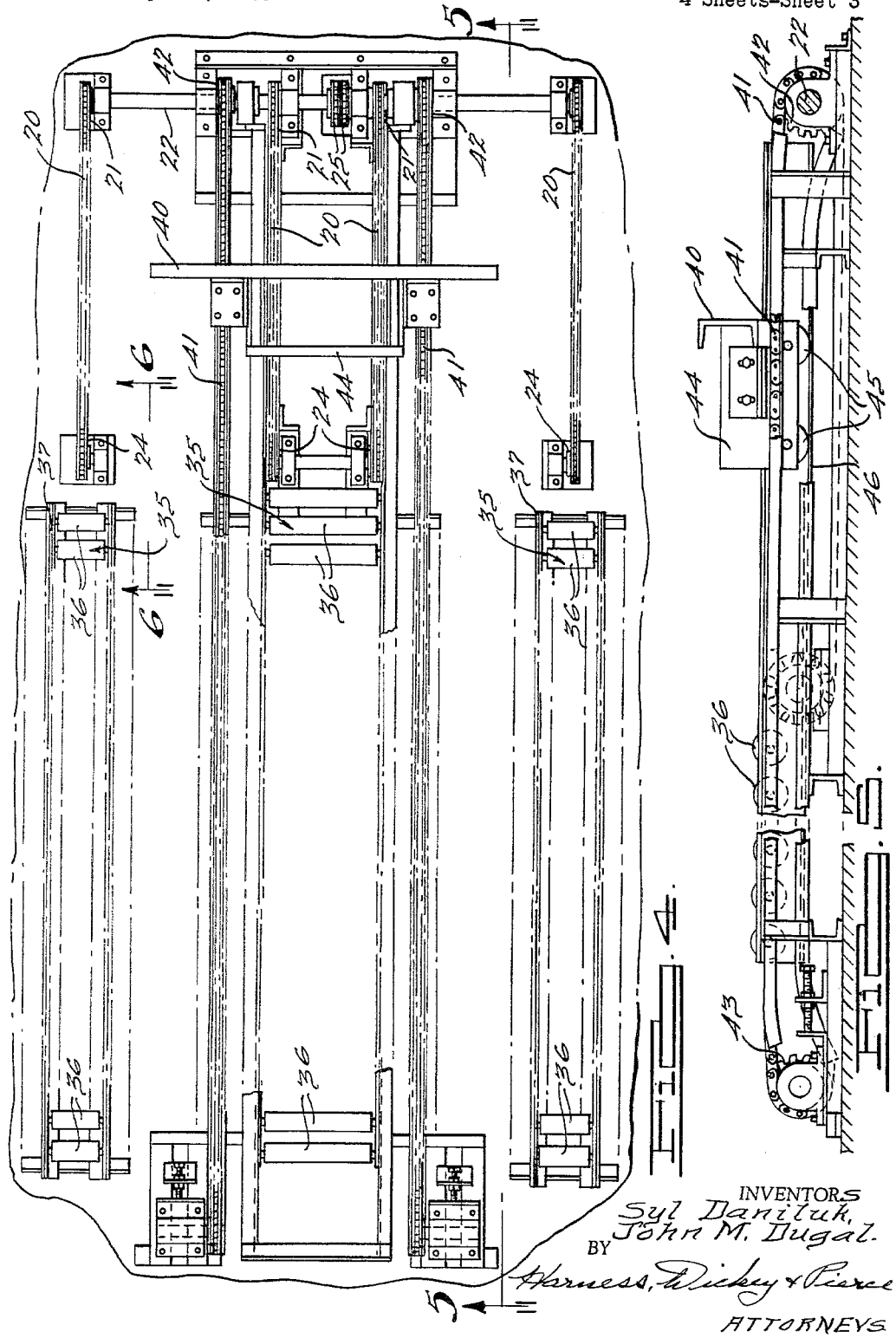
INVENTORS
Syl Daniluk,
John M. Dugal.
BY
Harness, Dickey & Pierce
ATTORNEYS

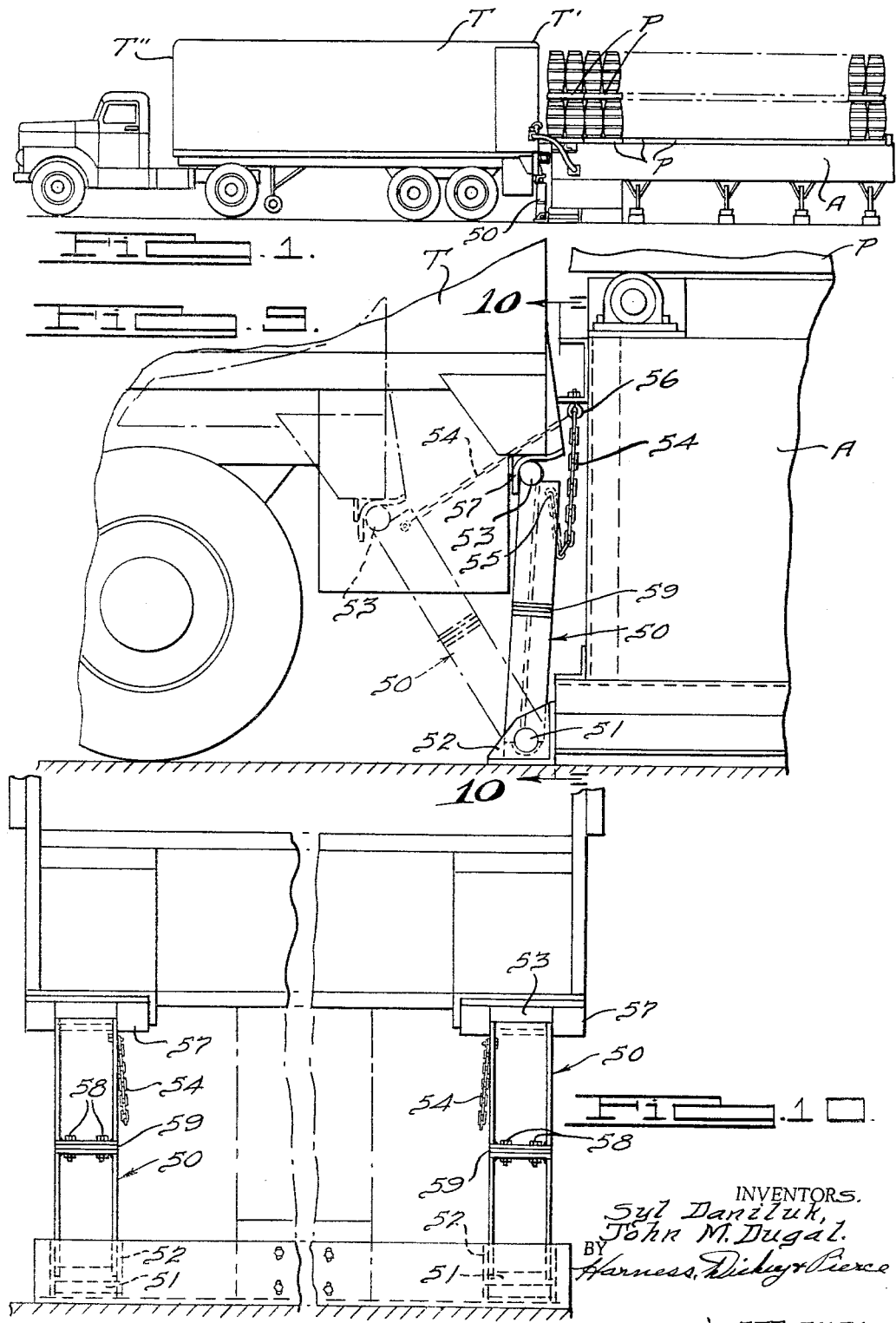

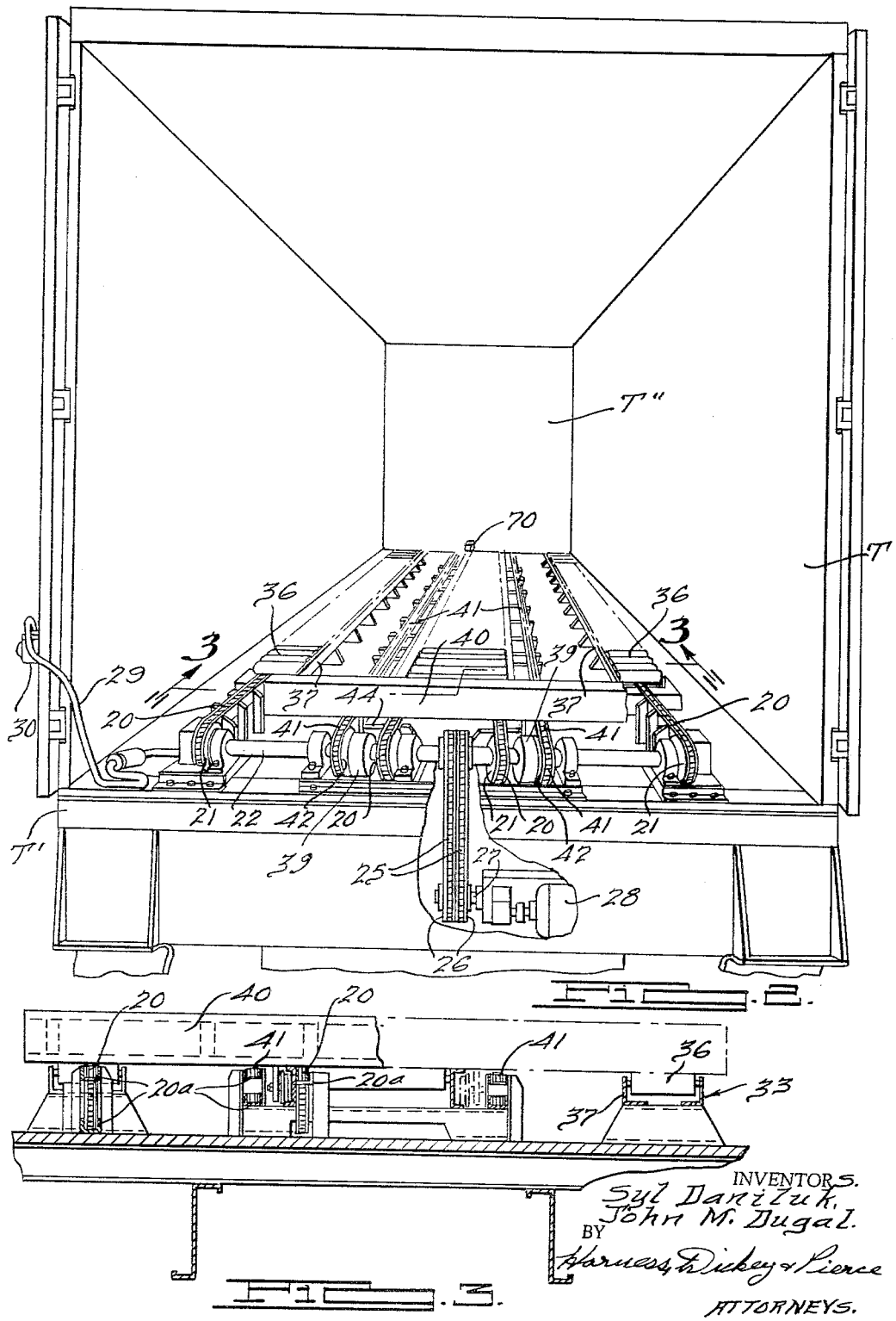

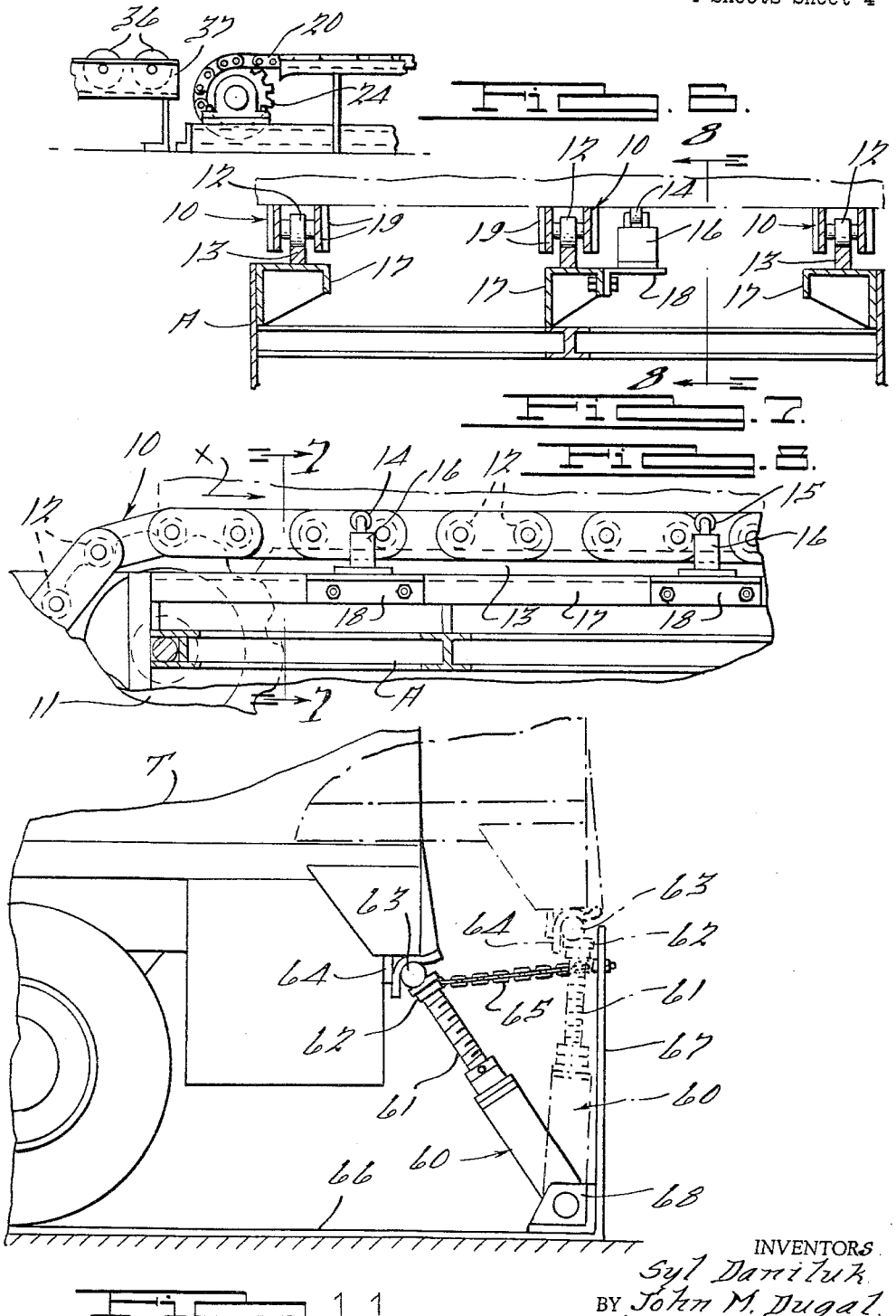

United States Patent Office 3,250,408
Patented May 10, 1966

3,250,408
TRUCK LOADING AND UNLOADING DEVICE
Syl Daniluk and John M. Dugal, Windsor, Ontario, Canada, assignors to McInnis Conveyors Limited
Filed Sept. 3, 1963, Ser. No. 306,172
6 Claims. (Cl. 214—38)

This invention relates to a truck loading and unloading device and, more particularly, to a device of this type adapted to automatically handle palletized or unitized loads of material in a quick and efficient manner.

One of the objects of this invention is to provide dock means or an accumulating area for accumulating trailer loads ready for immediate loading when the trailer arrives, and to receive complete trailer loads quickly, thereby eliminating the necessity of delaying the trailers whereby each trailer may be used for efficiently and the operating costs may be effectively reduced.

Another object of the invention is to provide a device of this type having means in the trailer for receiving the loaded pallets on conveyor lanes to load the trailer and having power driven means for unloading the pallets from the trailer to a dock, accumulating area, or the like.

Still another object of the invention is to provide means for leveling the trailer with the dock or accumulating area whereby the loaded pallets or unitized loads may be readily transferred from the trailer to the dock or accumulating area or vice versa.

The various objects and advantages, and the novel details of construction of a commercially practical embodiment of the invention, will become more apparent as this description proceeds, especially when considered in connection with the accompanying drawings, in which:

FIGURE 1 is a side elevational view of a trailer and dock or accumulating area incorporating this invention;

FIGURE 2 is a view of the interior of the trailer showing the pallet conveying means;

FIGURE 3 is a sectional view taken substantially on the plane indicated by line 3—3 in FIGURE 2;

FIGURE 4 is a plan view of the conveyor means when mounted on the floor of the trailer;

FIGURE 5 is a sectional elevational view of the structure shown in FIGURE 4 taken substantially on the plane indicated by line 5—5 in FIGURE 4;

FIGURE 6 is a detail sectional view taken substantially on the plane indicated by line 6—6 in FIGURE 4;

FIGURE 7 is a sectional view of the dock or accumulating device illustrated in FIGURE 8, taken on the line 7—7 thereof;

FIGURE 8 is a sectional view of the structure illustrated in FIGURE 7, taken on the line 8—8 thereof;

FIGURE 9 is a fragmentary elevational view of the trailer end and dock showing the trailer leveling means;

FIGURE 10 is a sectional elevational view taken substantially on the plane indicated by line 10—10 in FIGURE 9; and FIGURE 11 is a view similar to FIGURE 9 showing a slightly modified form of construction.

This invention, which relates to a truck loading and unloading device particularly adapted for handling palletized or unitized loads of material, contemplates the use of a truck or trailer T adapted to have palletized or unitized loads of material contained on pallets P loaded thereinto or unloaded therefrom. The palletized loads of material are adapted to be stacked or accumulated on a dock or accumulating area A in juxtaposition to which the truck or trailer T is parked during the loading and unloading operations. As is customary, the rear open end T' of the trailer is the loading end and T" indicates the forward or closed end of the trailer.

The dock or accumulating area A is provided with a plurality of chain conveyors 10, herein illustrated as three in number, passing around sprockets 11 at each end thereof, one of which is shown in FIGURE 8. As illustrated in FIGURES 7 and 8, the conveyor chains 10 have rollers 12 of the upper flights which run on rails 13 guided between links 19 of the chains. The rails 13 are supported on inverted channel elements 17 which are part of the dock structure.

One or both of the sprockets 11 are driven by power means (not shown) and the driving means is such that the conveyor chains 10 may be driven in both directions to both load and unload the accumulating area or dock A. The movement of the conveyor chains 10 in the direction of arrow X in FIGURE 8 may be controlled by a pair of limit switches 16 mounted on brackets 18. The limit switches are actuated by rollers 14 and 15 so arranged that when the pallet P engages the roller 14, the conveyor chains 10 will be moved in the direction of arrow X, and when the pallet P passes off the roller 15, the movement of the conveyor chains 10 is stopped. Thus, as the pallets are successively loaded onto the accumulating area or dock A, the loaded or stacked pallets P may be loaded onto the dock A in the manner shown in FIGURE 1.

The trailer or truck T is provided with a plurality, here shown as four, short conveyor chains 20 which pass around spaced sprockets 21 mounted on a drive shaft 22 journaled in suitable bearings carried by the trailer T. The reference character 24 indicates the sprockets for the other ends of the conveyor chains 20.

The drive shaft 22 for the conveyor chains 20 may be driven in any suitable manner, but is here shown as being driven by chains 25 passing around the drive sprockets 26 on a shaft 27 driven by a motor 28.

Electric power may be supplied to the motor 28 by means of a conduit 29 which may be connected by a plug 30 to a source of power when the trailer T is backed up into juxtaposition with the loading area A.

The conveyor chains 20 extend a short distance inwardly from the loading end T' of the trailer to a point adjacent the ends of longitudinally extending roller conveyors 35. Three of these roller conveyors are illustrated, one being arranged coincident with the longitudinal center of the trailer, and the other two being arranged at the sides thereof. Obviously, however, the arrangement and number of roller conveyors 35 may be altered as desired. Each roller conveyor consists of a plurality of freely rotatable rollers 36 mounted in a frame 37 supported on the bottom of the trailer or a subframe member inserted into and resting on the bottom of the trailer. The arrangement is such that pallets, loaded or unloaded, are moved onto the conveyors 20 and are moved by these conveyors onto the roller conveyors 35 and the pallets on the conveyors 35 are moved towards the forward end T" of the trailer by the subsequent pallets as they are moved forward by the conveyors 20.

It will be understood that the rollers 36 of the roller conveyors 35 are freely rotatable so that a previously positioned pallet P may be pushed along the roller conveyors 35 by the next pallet as it is loaded onto and moved by the chain conveyors 20. Thus, palletized or unitized loads of material of the pallets P may be successively loaded onto the trailer T.

The reference character 40 indicates a transversely extending abutment bar which is adapted to be moved longitudinally of the trailer T. The abutment bar is attached to chains 41 which are driven in one direction by sprockets 42 from one-way clutches 39 mounted on the drive shaft 22. The other ends of these chains pass over idler sprockets 43 at the other end thereof mounted in the forward end T″ of the trailer.

The abutment bar 40 is carried by a buggy 44 provided with wheels 45 (see FIGURE 5) mounted on tracks 46 extending longitudinally of the trailer. The buggy 44 is connected to the chains 41 which are driven in one direction by the sprackets 42 and one-way clutches 39 to move the abutment bar toward the unloading end of the trailer. The one-way clutches 39 permit the movement of the abutment bar 40 to the left or away from the unloading end of the trailer as viewed in FIGURES 4 and 5 by the advance of the pallets in engagement therewith. The abutment bar 40 is adapted to be engaged by the first pallet loaded onto the trailer and as successive pallets are loaded onto the trailer, the abutment bar 40 will be pushed to the forward end T″ of the trailer. When it is desired to unload the pallets from the trailer, the drive shaft 22 is rotated clockwise to drive the chains through the one-way clutches 39 and sprockets 42 to move the abutment bar 40 from the left-hand end of the trailer, as viewed in FIGURES 4 and 5, to the right-hand end thereof to discharge the pallets. During this unloading movement, the pallets are advanced along the roller conveyors 35 and onto the chain conveyors 20 and by the chain conveyors 20 onto the conveyors 10 on the accumulating area A.

As shown probably best in FIGURE 3, the chain conveyors 20 and chains 41 ride in channel-shaped members 20a so as to be adequately supported thereby.

From the description thus far, it will be apparent that the palletized or unitized loads of material may be moved from the trailer onto the accumulating area A to unload the trailer, or by reversing the movement of the conveyors, the loaded pallets may be moved from the accumulating area onto the trailer in a very quick and efficient manner.

Frequently, the upper surface of the conveyor chains 20 does not coincide with the upper surface of the conveyor chains 10 on the dock or accumulating area A when the trailer is backed into juxtaposition with the accumulating area to load or unload the pallets. In order to compensate for this discrepancy, the accumulating area and trailer may be provided with automatic trailer leveling means, one form of which is illustrated in FIGURES 9 and 10. This trailer leveling means consists of a plurality, here shown as two, arms 50 each pivotally mounted as at 51 to a bracket 52 secured to the dock or accumulating area A adjacent the base thereof. Each arm 50 is provided at its upper end with a roller or rounded surface 53. The arms 50, when not in use, are held in an inclined position shown in dot-and-dash lines in FIGURE 9 by means of a flexible element, such as a chain 54 connected as at 55 to the arm 50 and as at 56 to the dock or accumulating area. The roller or rounded member 53 of each arm 50 is adapted to engage an abutment member 57 carried by the end of the trailer so that as the trailer is backed into juxtaposition with the dock or accumulating area A, the abutment member 57 will engage the rounded member 53 and move the leveling arm from the dot-and-dash line position shown in FIGURE 9 to the full-line position shown in this figure. This will swing the arm 50 to an upright position and raise the rear end of the trailer so as to bring the upper surfaces of the chain conveyors 20 in the trailer into alignment with the chain conveyors 10 on the dock or accumulating area. As shown in FIGURES 9 and 10, each arm 50 may be formed in two sections secured together by bolts 58. Shims 59 of proper thickness are interposed between the ends of the sections of the arms 50 so that arms of the proper length may be provided to raise the end of the trailer sufficiently for the purposes described.

In FIGURE 11, a modification of these arms is illustrated in which each arm 60 includes a threaded portion 61 which may be rotated with respect to the other portion of the arm to longitudinally adjust the length of the leveling arm. The adjustable portion 61 of each arm is provided with a swivelly connected head 62 carrying a rounded member 63 adapted to engage an abutment member 64 carried by the rear end of the trailer T. A flexible element, such as a chain 65, holds the arm in inclined position.

In this form of construction the arms 60 may be, and preferably are, mounted on a base 66 having an upright portion 67 connected thereto or formed as an integral part of the base 66. The flexible element 65 is connected to the portion 67. The arms 60 are each pivotally mounted to the base 66 by means such as a bracket 68. Thus the arms 60 and base 66 comprise a unit which may be placed adjacent the end of a dock or the accumulating area A to provide automatic trailing leveling means. In operation, these leveling arms operate in the same manner as the form of construction illustrated in FIGURES 9 and 10. However, in this form of construction, the unit comprising the base 66 and arms 60 may be optionally placed adjacent the end of a dock or the like and as the truck or trailer is backed into juxtaposition with the dock, the wheels of the truck or trailer will ride onto the base 66 and the weight of the truck or trailer will hold the unit in position during its subsequent operation.

Thus, it will be seen that as the trailer is backed up into juxtaposition with the dock or loading area A, the rear end of the trailer will be raised slightly to align the chain conveyors 10 carried by the dock or accumulating area A with the chain conveyors 20 carried by the trailer.

If desired, a limit switch 70 adapted to be engaged by the first pallet which is loaded may be provided at the forward end T″ of the trailer to open the circuit to the motor 28 when the trailer is completely filled with pallets to prevent further motion of the conveyor chains 20.

From the foregoing, it will be readily apparent that there is provided means for quickly and efficiently loading and unloading trucks and trailers without necessitating the uncoupling of the trailers, whereby each trailer may be used efficiently, thus materially reducing operating costs. Before a trailer arrives, the dock or accumulating area may be stacked with loaded pallets, as illustrated in FIGURE 1, which, when the trailer arrives, may be quickly and easily loaded thereonto. Also, the trailer may be quickly and easily unloaded and the loaded pallets deposited on the dock or accumulating area A. In practice, the herein described arrangement has been found to be highly effective in handling a multiplicity of palletized or unitized loads of material, as will be apparent.

While one commercially practical embodiment of the invention has been described and illustrated herein somewhat in detail, it will be understood that various changes may be made as may come within the purview of the accompanying claims.

What is claimed is:

1. In a device of the class described for handling loaded pallets and the like, an accumulating area, a chain conveyor in the accumulating area, motor means for driving said chain conveyor in either direction, a trailer or the like having a bed, a loading conveyor at the loading end of said trailer having spaced chains located at the sides of the bed, a pair of roller conveyors in the forward end of the trailer located in continuation of the chains of the loading conveyor, and unloading conveyor means within the trailer having driving means located between said roller conveyors.

2. A device as described in claim 1 in which the unloading conveyor means embodies an abutment member located above said roller conveyors for engaging and moving the pallets to the rear end of the trailer.

3. In a device of the class described for handling loaded pallets and the like, an accumulating area, a chain conveyor in said area, motor means for driving said chain conveyor in both directions to load and unload pallets thereon, a trailer or the like having a bed, a chain conveyor on the bed at the loading end of the trailer embodying a pair of spaced chains located on opposite sides of the longitudinal center line of the trailer, a pair of roller conveyors, each forming a continuation of a chain of the trailer chain conveyor in the forward end of the trailer, means for driving said trailer chain conveyor, unloading conveyor means in the forward end of the trailer, and means between said roller conveyors for moving the unloading conveyor means toward the rear end of the trailer.

4. A device as described in claim 3 wherein the unloading conveyor means embodies a transverse abutment member which extends above the roller conveyors for engaging the forwardmost pallets thereon.

5. In a device of the class described for handling loaded pallets and the like, an accumulating area, a chain conveyor in said accumulating area, motor means for driving the chain conveyor in either direction for loading and unloading pallets thereon, a trailer or the like having a bed, a chain conveyor at the loading end of said trailer consisting of at least two chains disposed in spaced relation to each other each side of the longitudinal center line of the trailer bed, motor means for driving said trailer chain conveyor, a pair of roller conveyors located in extension of the chains of said trailer chain conveyor, unloading conveyor means on said trailer bed, and means between said roller conveyors for moving said unloading conveyor means toward the loading end of the trailer.

6. A device as described in claim 5 in which the unloading conveyor means comprises an abutment member which is located above the rollers of the roller conveyors for engaging the forwardmost pallets on said roller conveyors.

References Cited by the Examiner
UNITED STATES PATENTS

| | | | |
|---|---|---|---|
| 1,602,146 | 10/1926 | Callison | 214—38.22 |
| 1,730,480 | 10/1929 | Shirreff | 214—517 X |
| 2,001,467 | 5/1935 | Madigan | 254—94 |
| 2,409,870 | 10/1946 | Kinnaird | 214—38 |
| 2,467,354 | 4/1949 | Baldwin | 214—38 |
| 2,672,993 | 3/1954 | Lee | 214—84 |
| 2,710,105 | 6/1955 | Schwartz | 214—38.46 X |
| 2,952,443 | 9/1960 | Camarero | 254—94 |
| 3,059,789 | 10/1962 | Bowles | 214—41 |
| 3,075,659 | 1/1963 | Sylvester et al. | 214—38.20 |

GERALD M. FORLENZA, *Primary Examiner.*

HUGO O. SCHULZ, *Examiner.*